(12) United States Patent
Malhotra et al.

(10) Patent No.: US 8,560,785 B1
(45) Date of Patent: Oct. 15, 2013

(54) TECHNIQUES FOR PROVIDING MULTIPLE LEVELS OF SECURITY FOR A BACKUP MEDIUM

(75) Inventors: Gaurav Malhotra, Siliguri (IN); Shyam Prakash Velupula, Deshaipet (IN); Vijaysinh Rangrao Mohite, Baner (IN); Raymond W. Gilson, Saint Paul, MN (US); Thomas Clifford, Edina, MN (US)

(73) Assignee: Symantec Corporation, Mountain View, CA (US)

( * ) Notice: Subject to any disclaimer, the term of this patent is extended or adjusted under 35 U.S.C. 154(b) by 519 days.

(21) Appl. No.: 12/131,533

(22) Filed: Jun. 2, 2008

(51) Int. Cl.
*G06F 13/00* (2006.01)
(52) U.S. Cl.
USPC ............................................. 711/162
(58) Field of Classification Search
None
See application file for complete search history.

(56) References Cited

U.S. PATENT DOCUMENTS

| | | | | |
|---|---|---|---|---|
| 5,699,428 | A * | 12/1997 | McDonnal et al. | 713/165 |
| 6,981,141 | B1 * | 12/2005 | Mahne et al. | 713/165 |
| 2005/0071275 | A1 * | 3/2005 | Vainstein et al. | 705/51 |
| 2005/0137983 | A1 * | 6/2005 | Bells | 705/51 |
| 2005/0154885 | A1 * | 7/2005 | Viscomi et al. | 713/165 |
| 2007/0079117 | A1 * | 4/2007 | Bhogal et al. | 713/160 |
| 2007/0174362 | A1 * | 7/2007 | Pham et al. | 707/204 |
| 2008/0273696 | A1 * | 11/2008 | Greco et al. | 380/44 |

OTHER PUBLICATIONS

CommVault Data Sheet; CommNet Service Manager 7.0, retrieved from the Internet at: http://www.commvault.com/pdf/DS_CNSM_Overview.pdf (2007).
"A CommVault White Paper: CommVault Galaxy Backup & Recovery", CommVault Systems, Inc., 2008, 39 pages.
"IBM Tivoli Storage Manager Version 5.5—Using the Application Programming Interface", International Business Machines Corporation, 2007, 308 pages.

\* cited by examiner

*Primary Examiner* — Duc Doan
(74) *Attorney, Agent, or Firm* — Wilmer Cutler Pickering Hale and Dorr LLP

(57) ABSTRACT

Techniques for providing multiple levels of security for backups are disclosed. In one particular exemplary embodiment, the techniques may be realized as a method for providing multiple levels of security for a backup medium comprising protecting a data portion of the backup medium with a first security mechanism, and protecting a metadata portion of the backup medium with a second security mechanism.

19 Claims, 4 Drawing Sheets

400

| Field Offset | Field Size | Field |
|---|---|---|
| 0 | 100 | File Name |
| 100 | 8 | File Mode |
| 108 | 8 | Owner User ID |
| 116 | 8 | Group User ID |
| 124 | 12 | File Size in Bytes |
| 136 | 12 | Last Modification Time |
| 148 | 8 | Checksum for Header Block |
| 156 | 1 | Link Indicator |
| 157 | 100 | Name of Linked File |

410 — File Name
420 — Owner User ID
430 — Group User ID

Fig. 4

TECHNIQUES FOR PROVIDING MULTIPLE LEVELS OF SECURITY FOR A BACKUP MEDIUM

FIELD OF THE DISCLOSURE

The present disclosure relates generally to providing security for backups and, more particularly, to techniques for providing multiple levels of security for a backup medium.

BACKGROUND OF THE DISCLOSURE

Large amounts of data are stored on backups in various forms and on a variety of media. Frequently, backups are stored in a location separate from a primary residence or business data center. This may prevent the loss of some data in the event of a fire, flood, or another destructive event. Backup media may be maintained by third parties who may maintain a catalog of such data in order to manage the data. Backup data may contain sensitive information such as personal information, trade secrets, account information, national security information, and other confidential data.

Backup data on a medium may be composed of different portions. For example, on tape backups, a tape may be divided into data images, a tape label, and metadata. The tape label may be a numeric identifier. The data images may contain the vast majority of the data. The metadata may identify an owner of the tape, a file name, and/or other details about the content of the data image.

The metadata may be utilized by a backup management system or administrator to manage backup data. For example, the metadata may enable the creation of a catalog or other system which may enable an administrator or other user to locate the backup media in response to a request for information. The metadata may contain increasing amounts of detail in order to provide meaningful search or management capabilities to a backup management program. Metadata may pertain to data that is sensitive, thus disclosure of the metadata may not be desirable. Metadata may also enable an unauthorized user to piece together a broad high level picture of an organization or individual that an owner of the metadata does not wish to disclose. As volume of individual backups grows with increased storage capacity of storage media, and as the number of backups grow with increasing amounts of data produced by businesses, requirements for managing backups utilizing metadata may increase.

Data images may be encrypted to prevent disclosure or theft of sensitive data. However, metadata is not currently encrypted. Encryption of metadata may prevent an individual or process from effectively managing data. For example, encryption of metadata may disable an offsite backup storage center's ability to search among backup media in order to locate a particular backup medium.

In view of the foregoing, it may be understood that there are significant problems and shortcomings associated with current backup security technologies.

SUMMARY OF THE DISCLOSURE

Techniques for providing multiple levels of security for backups are disclosed. In one particular exemplary embodiment, the techniques may be realized as a method for providing multiple levels of security for a backup medium comprising protecting a data portion of the backup medium with a first security mechanism, and protecting a metadata portion of the backup medium with a second security mechanism.

In accordance with other aspects of this particular exemplary embodiment, the techniques may be realized as an article of manufacture providing multiple levels of security for a backup medium. The article of manufacture may comprise at least one processor readable carrier, and instructions carried on the at least one carrier, wherein the instructions may be configured to be readable from the at least one carrier by at least one processor and thereby cause the at least one processor to operate so as to receive data and metadata associated with the data, protect a data portion of the backup medium with a first security mechanism, and protect a metadata portion of the backup medium with a second security mechanism.

In accordance with further aspects of this particular exemplary embodiment, the techniques may be realized as a system providing multiple levels of security for a backup medium. The system may comprise one or more processors communicatively coupled to a network, wherein the one or more processors may be configured to receive data and metadata associated with the data, protect a data portion of the backup medium with a first security mechanism, and protect a metadata portion of the backup medium with a second security mechanism.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 4 depicts a backup file header in accordance with an embodiment of the present disclosure.

DETAILED DESCRIPTION OF EXEMPLARY EMBODIMENTS

Figure 1:
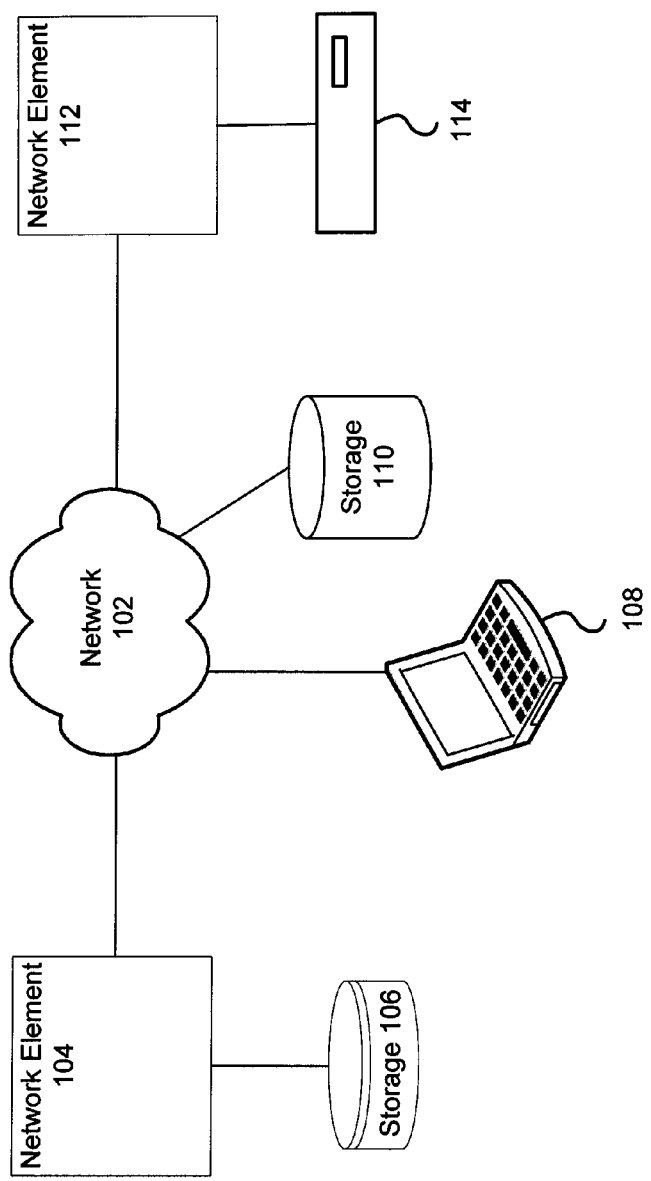
FIG. 1 shows a system for providing multiple levels of backup security in accordance with an embodiment of the present disclosure.

Referring to FIG. 1, there is shown a system 100 for providing multiple levels of backup security in accordance with an embodiment of the present disclosure. FIG. 1 is a simplified view of system 100, which may include additional elements that are not depicted. Network elements 104 and 112 may be communicatively coupled to network 102. Network element 104 may be communicatively coupled to storage 106. Network element 112 may be communicatively coupled to media drive 114. Computer 108 may be communicatively coupled to network 102. Storage 110 may be communicatively coupled to network 102.

Network 102 may be a local area network (LAN), a wide area network (WAN), the Internet, a cellular network, a satellite network, or another network that permits communication between network elements 104 and 112, computer 108, and other devices communicatively coupled to network 102.

Network elements 104 and 112 may be application servers, backup servers, network storage devices, media servers, or other devices communicatively coupled to network 102. Network elements 104 and 112 may utilize storage 106 and media drive 114 for the storage of application data, backup data, or other data.

Network element 104 may be a host, such as an application server, which may compress/decompress and/or encrypt/decrypt data traveling between itself and a backup device.

Network element 112 may be a backup server attached to media drive 114. In one or more embodiments, network element 112 may be capable of encrypting and/or decrypting one or more portions of a backup transferred to and/or received from media drive 114. In other embodiments, network element 112 may represent a network appliance connected to a storage area network. Network element 112 may compress/decompress and/or encrypt/decrypt data traveling between a storage area network and media drive 114.

Storage 106 may be local, remote, or a combination thereof to network elements 104 and 112. Storage 106 may utilize a redundant array of inexpensive disks (RAID), striped disks, hot spare disks, tape, or other network accessible storage. In one or more embodiments, storage 106 may be a storage area network (SAN), an internet small computer systems interface (iSCSI) SAN, a Fibre Channel SAN, a Common Internet File System (CIFS), Network Attached Storage (NAS), or a Network File System (NFS).

Computer 108 may be a desktop computer, a laptop computer, a server, or other computer utilized by a user of a backup management system. Computer 108 may utilize storage 110 or other storage for backup management. Computer 108 may provide a user interface for a user to view, create, edit, and delete backup management policies, search backup management catalogs, perform backup operations, and other actions.

Storage 110 may be network accessible storage and may be local, remote, or a combination thereof to network elements 104 and 112. Storage 110 may utilize a tape, disk, a storage area network (SAN), or other computer accessible storage. In one or more embodiments, Storage 110 may represent a database which may be utilized to store backup management software and backup management data. Backup management data may include a backup catalog.

Media drive 114 may represent a device capable of recording a backup on storage media. In one or more embodiments, it may be a hard disk, flash memory, or other storage. In other embodiments, it may be a tape drive, an automated tape library, a floppy disk drive, other magnetic storage drives, and/or an optical disk drive. Media drive 114 may be local storage or it may be remote storage such as a Storage Area Network (SAN), an internet Small Computer Systems Interface (iSCSI) SAN, a Fibre Channel SAN, a Common Internet File System (CIFS), Network Attached Storage (NAS), or a Network File System (NFS). In one or more embodiments, media drive 114 may represent a drive that may contain hardware for encrypting and/or decrypting content written to and/or read from storage media. For example, media drive 114 may represent a SCSI (Small Computer Systems Interface) based tape drive that may contain a computer chip for encrypting and/or decrypting data. Media drive 114 may utilize SCSI SECURITY_PROTOCOL_IN and SECURITY_PROTOCOL_OUT commands. These commands may enable an application client, such as a backup management program, to send and receive security information to media drive 114.

Network elements 104 and 112 and media drive 114 may utilize hardware, software, or a combination to perform compression/decompression and/or encryption/decryption. One or more encryption algorithms may be implemented including data encryption standard (DES), triple DES, advanced encryption standard (AES), and other encryption ciphers. Additional security mechanisms such as codes, hash functions, and checksums may be implemented.

Encryption may be implemented for multiple portions of a backup medium. Each portion may implement separate keys. For example, a backup tape may be encrypted by media drive 114. Media drive 114 may receive a separate encryption key from backup management software for each portion of data to be encrypted. A label containing only a numeric identifier may remain unencrypted so that the backup medium may be recognized by a backup management system. Metadata stored on the backup medium may be encrypted by a first encryption key provided to media drive 114. Data images stored on the backup medium may be encrypted by utilizing a second key.

In one or more embodiments, backup management software may provide the one or more keys to a device or process as data is being encrypted or decrypted. This may enable backup management software to manage different levels of encryption for different portions of data. The different levels of encryption may be determined by one or more backup policies set by an administrator or other user via the backup management software. Thus, an owner or administrator of the backup medium may provide a key enabling access to metadata to an offsite data archiving location or organization. This may enable an offsite archiving location or organization to manage storage media without accessing sensitive data images. The key providing access to metadata may be sent securely and separately from storage media sent to the offsite location. In this manner, if storage media are stolen, lost, or otherwise accessed by unauthorized individuals, the metadata or data images stored on the storage media may not be accessed by the unauthorized individuals. Similarly, a backup strategy may involve encrypting metadata and data images within an organization so that only authorized individuals may have access to the metadata and/or data images.

Encryption or decryption may be performed at a backup server, a network appliance connected to a storage area network, a server or host, and/or a storage device such as a media drive. One or more of these components may generate, store, and/or receive one or more keys for encryption. In one or more embodiments, metadata may be encrypted in multiple portions. For example, metadata may contain a first portion, such as a specified number of fields, which may be encrypted with a key associated with a backup administrator. These fields may be accessed by a backup administrator with the corresponding key so that the backup administrator may categorize and find a particular backup medium. A second portion of metadata may be encrypted with a different key associated with a group of users who are associated with backed up data. A group may correspond, for example, to a corporate department, a branch office, a region, a list of users, or another subdivision. Metadata at a group level may enable a group to access more detail related to their backed up data. A third portion of metadata may be encrypted by a third key which may provide access to the most sensitive of metadata. This may be the same key utilized to encrypt data images on the backup medium that the metadata is associated with or it may be a separate key.

Groups or users may have access to multiple keys. For example, an owner of human resources data stored on a storage medium may have access to three keys which may provide access to two different portions of metadata and access to data images. An administrator or other user managing backup for the human resources group may have access to two keys which may provide access to all metadata information associated with the storage medium but not to data images. An outside administrator, who may archive data, may only have access to one key which may provide access to only a subset of less sensitive metadata.

In some embodiments, encryption of metadata portions may correspond to fields in a file header of a backup medium. Each field in a file header may be encrypted separately or multiple fields may share a key. The division of the data may be determined by a backup policy. One or more roles may be utilized in a backup policy to determine access to one or more portions of metadata and/or data images. For example, a user assigned a group role may have access to one or more keys assigned by backup management software or by a backup policy to that group.

Metadata and/or backup header files may contain one or more user defined fields which may specify sensitivity of a data file, its associated metadata, or both. For example, a designer of a backup management system may enable a user, such as a data file owner, to specify an indicator in a user defined field. This indicator may determine a level of encryption to be utilized when encrypting a document. In other embodiments, a field such as a group identifier, an owner, a department identifier, a subject, a category, or another indicator may be utilized to determine a level of access. In another example, an indicator may specify presence of account information, medical information, social security information, national security information, trade secrets, or other sensitive information in a file.

Encryption may occur when data is being backed up so that data may not remain outside of a source of origin in an unprotected state. For example, data may be encrypted when a host or a process on a host sends data for backup. Data may also be encrypted when a network appliance retrieves data from a storage area network to send it for backup. Data may be encrypted by a backup server and data may also be encrypted by a backup storage device. In one or more embodiments, data may only be encrypted if it is to be transmitted outside of a specified area, such as sent off of a company network, a group file server, or sent offsite for archiving. In some embodiments, different levels of encryption may occur at different times. For example, data images may be encrypted prior to or on transfer to a storage disk. Metadata, however, may be encrypted prior to transfer offsite for archival. Thus, if a disk or other storage medium is rewritten prior to transfer (e.g., written to tape prior to archival), encryption of metadata may occur during or prior to transfer of the metadata.

Backup management systems and/or software may contain catalogs, directories, databases, lists, metadata, or other information about backup media. Security for this data may follow the same or different policies as the backup media. For example, a backup file on an optical disk, a magnetic disk, or a tape may contain a header file or other metadata associated with data images in the backup file. Identical metadata, a subset of the metadata, or a superset of the metadata may be contained in a catalog utilized by a backup management system. This metadata may be encrypted according the same policy for the backup file or according to a different policy. This may ensure that sensitive or confidential metadata pertaining to a backup file may not be improperly accessed via a catalog of the backup management system or via a backup of a catalog of the backup management system.

In one or more embodiments, multiple levels of security, such as encryption, may be utilized in virtual tape libraries.

Figure 2:
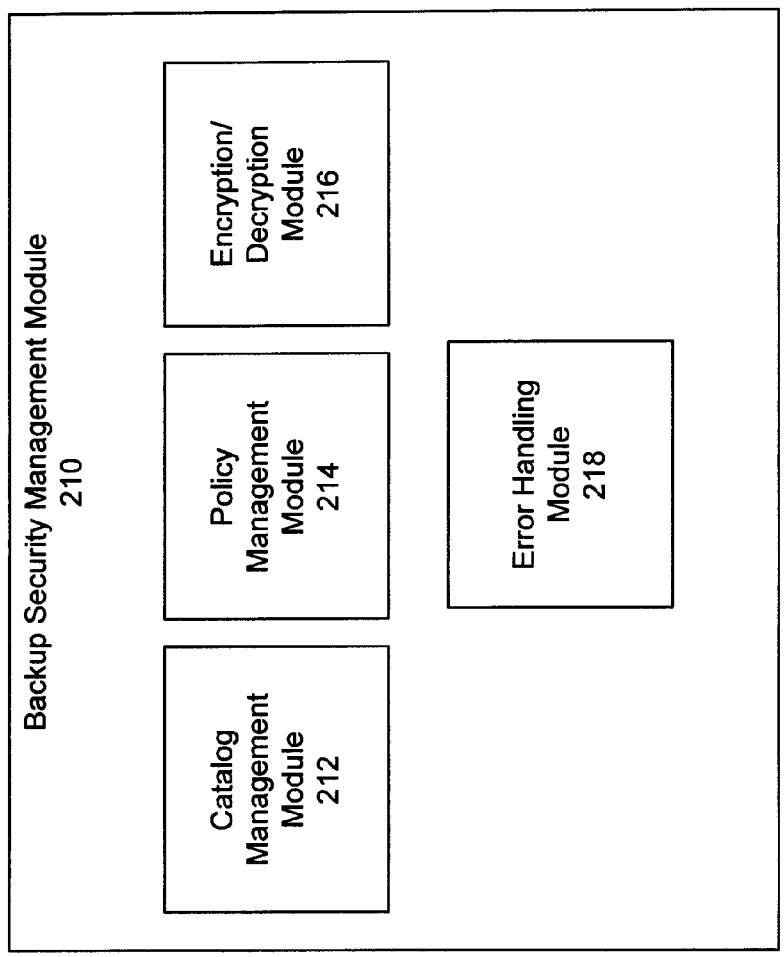
FIG. 2 shows a module for providing multiple levels of backup security in accordance with an embodiment of the present disclosure.

Referring to FIG. 2, there is shown a module 210 for providing multiple levels of backup security in accordance with an embodiment of the present disclosure. As illustrated in FIG. 2, backup security management module 210 may contain one or more components including catalog management module 212, policy management module 214, encryption/decryption module 216, and error handling module 218.

Catalog management module 212 may handle security related to metadata information utilized by backup management software, systems, or processes. Catalog management module 212 may encrypt and/or decrypt one or more portions of data utilized by a backup management system in accordance with a backup management policy.

Policy management module 214 may enable a user, system, or process to set a security policy for backup data, metadata, and/or catalog data. Policy management module 214 may enable a setting of multiple levels of access, a definition and use of one or more roles, a selection of encryption algorithms, encryption keys, a timing of encryption, and other security policy details. Policy management module 214 may provide a list of users, hosts, groups, departments, roles, geographic locations, and other groupings to facilitate a definition of security policies. Policy management module 214 may generate one or more keys and may associate a key with an access level. Policy management module 214 may provide a key to an encrypting device or process as a portion of data is written to ensure that the portion of data is secured according to a policy. In one or more embodiments, policy management module 214 may ensure that separate keys are utilized for each backup file. Policy management module 214 may determine how files are organized among one or more backup media. This may enable files of a same level of access to be grouped on a same storage medium and may thus reduce a number of levels of access and keys required to access a particular storage medium. Policy management module 214 may destroy one or more keys when data on one or more storage media has expired and is to be deleted.

Encryption/decryption module 216 may encrypt or decrypt one or more portions of data. Encryption/decryption module 216 may receive one or more keys for use in encrypting or decrypting one or more portions of data. Encryption/decryption module 216 may provide encryption of data, digital signatures, digital certificates, and other security mechanisms. In one or more embodiments, encryption/decryption module 216 may utilize a plurality of encryption algorithms. In one or more embodiments, encryption/decryption module 216 may utilize a hash function for fingerprint functions, checksums, and other functionality.

Error handling module 218 may handle errors with encryption, decryption, security policies, catalog management, or other processes. Error handling module 218 may log security errors such as access attempts, incorrect encryption keys and other security related events.

Figure 3:
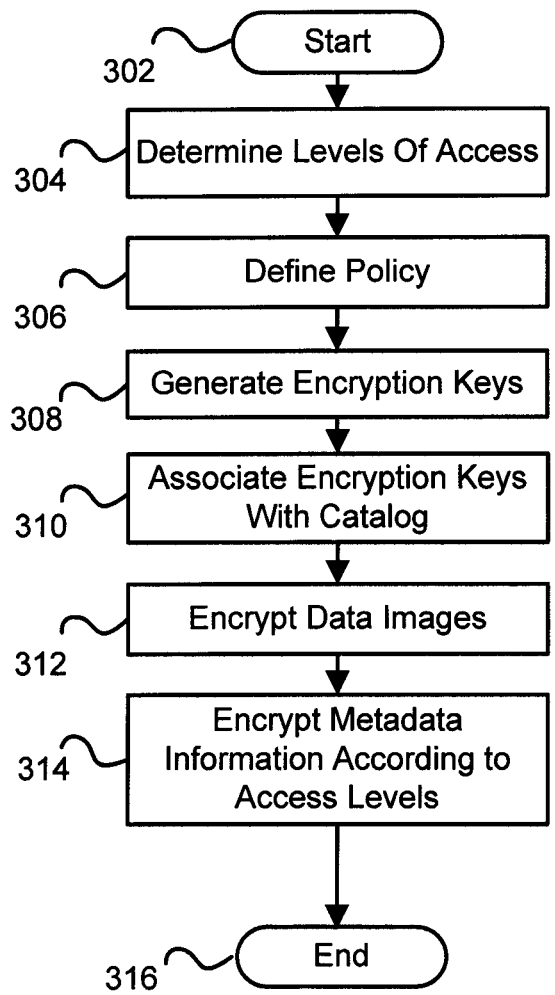
FIG. 3 depicts a method for providing multiple levels of backup security in accordance with an embodiment of the present disclosure.

Referring to FIG. 3, there is depicted a method 300 for providing multiple levels of backup security in accordance with an embodiment of the present disclosure.

At block 302, the method for providing multiple levels of backup security may begin.

At block 304, levels of access may be determined. This may be set by an owner of data, a group to which data belongs, an administrator, or another user. In some embodiments, access may be determined by a source of data, such as a group, host, or geographic region. Access may also be determined by subject matter contained within a backup. A backup process may also identify an indicator in metadata associated with a backup which may in part determine a level of access.

At block 306, a backup policy may be defined. A backup policy may implement levels of access by mapping roles and/or keys to one or more portions of a backup file. A backup policy may ensure which portions of a file are to be encrypted by which keys and which process or system is going to encrypt one or more portions of data. A backup policy may map which users, groups, roles, or processes have access to which keys for decryption according to previously determined levels of access. A backup policy may specify which encryption algorithm to use and other security mechanism details.

At block 308, encryption keys may be generated. The generation of encryption keys may occur according to backup policy. New keys may be generated for each portion of a file, each file, on a periodic basis, or according to another algorithm. For example, according to some embodiments, a full backup set may utilize two keys, one for data images and one for metadata. A subsequent partial backup, such as, for example, occurring on the following day, may utilize two newly generated keys different from those utilized in the full backup.

At block 310, encryption keys may be associated with a catalog or other backup management system backup media directory. This may enable a backup system or process to correctly identify a proper key for one or more portions of data.

At block 312, data images may be encrypted utilizing a first key. In some embodiments, multiple portions of a data image may be encrypted separately by separate keys.

At block 314, metadata information may be encrypted. Metadata information may be encrypted with a separate key from that of the data images. Metadata information may be divided into portions and may be encrypted by multiple keys enabling multiple roles or layers of access to the metadata.

At block 316, the method may end.

Referring to FIG. 4, there is depicted a backup file header 400 in accordance with an embodiment of the present disclosure. Multiple formats of file headers may be utilized. File header formats may vary according to backup application, backup medium, and other factors. As illustrated, FIG. 4 depicts a tar format file header. Field 410 may represent a file name. Field 420 may represent an owner's user identification (ID). Field 430 may represent a group user ID. One or more of these fields, or other fields, may be utilized as an indicator to a backup system or process to apply a particular level of security. For example, a backup policy may specify that all human resource backup files encrypt metadata with a particular key. Field 430 may correspond to a group user ID for the human resources group on a particular data file. That data file may have its metadata encrypted with a particular key associated with the human resources group in the backup policy and its data images encrypted with a second key associated with the human resources group in the backup policy.

At this point it should be noted that providing multiple levels of backup security in accordance with the present disclosure as described above typically involves the processing of input data and the generation of output data to some extent. This input data processing and output data generation may be implemented in hardware or software. For example, specific electronic components may be employed in a media drive or similar or related circuitry for implementing the functions associated with encrypting and/or decrypting data and metadata in accordance with the present disclosure as described above. Alternatively, one or more processors operating in accordance with instructions may implement the functions associated with encrypting and/or decrypting data and metadata in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for providing multiple levels of security for a backup medium comprising:
    receiving at a media drive a plurality of encryption keys from backup management software, wherein at least one encryption key of the plurality of encryption keys is received at the media drive using a Small Computer System Interface (SCSI) command;
    encrypting, using at least one computer processor, a data portion of the backup medium with a first encryption key of the plurality of encryption keys;
    encrypting a first metadata portion of the backup medium with a second encryption key of the plurality of encryption keys;
    encrypting a second metadata portion with a third encryption key of the plurality of encryption keys, wherein the first encryption key, the second encryption key, and the third encryption key are different encryption keys based on different levels of access, and wherein a field in metadata is used by a backup policy to identify at least one of the first encryption key and the second encryption key; and
    providing an encryption key of the plurality of keys to an offsite archiving location, the encryption key providing access to the metadata, wherein the encryption key is provided to the offsite archiving location securely and separately from storage media.

2. The method of claim 1, wherein the backup medium comprises tape.

3. The method of claim 1, wherein at least one of the multiple levels of security corresponds to a user role.

4. The method of claim 1, wherein at least one of the multiple levels of security is determined by a backup policy.

5. The method of claim 1, wherein the third key is associated with a user defined field in the metadata portion of the backup medium.

6. The method of claim 1, wherein at least one of the first key and the second key is associated with an owner of the data identified in the metadata.

7. The method of claim 1, wherein at least one of the first key and the second key is associated with a group identified in the metadata.

8. The method of claim 1, further comprising providing a backup management catalog wherein metadata associated with the backup management catalog is protected by a security mechanism.

9. The method of claim 1, wherein at least one of the first key and the second key are handled by a media drive.

10. The method of claim 1, wherein at least one of the first key and the second key are handled by a server.

11. The method of claim 1, wherein at least one of the first key and the second key are used by software based encryption.

12. The method of claim 1, wherein at least one of the first key and the second key are used by hardware based encryption.

13. At least one non-transitory processor readable storage medium storing a computer program of instructions configured to be readable by at least one processor for instructing the at least one processor to execute a computer process for performing the method as recited in claim 1.

14. The method of claim 1, wherein at least one of the first metadata portion and the second metadata portion corresponds to a field in a file header of the backup medium and wherein each field in the file header is configurable for encryption separate from other fields in the file header according to a backup policy.

15. The method of claim 1, wherein only a portion of a backup medium containing a numeric identifier is unencrypted.

16. The method of claim 1, wherein the encryption of the data and the metadata is performed by a host prior to transmitting data offsite.

17. An article of manufacture providing multiple levels of security for a backup medium, the article of manufacture comprising:
   at least one non-transitory processor readable storage medium; and
   instructions carried on the at least one storage medium; wherein the instructions are configured to be readable from the at least one storage medium by at least one processor and thereby cause the at least one processor to operate so as to:
      receive at a media drive a plurality of encryption keys from backup management software, wherein at least one encryption key of the plurality of encryption keys is received at the media drive using a Small Computer System Interface (SCSI) command;
      receive data and metadata associated with the data;
      encrypt a data portion of the backup medium with a first encryption key;
      encrypt a first metadata portion of the backup medium with a second encryption key;
      encrypt a second metadata portion with a third encryption key, wherein the first encryption key, the second encryption key, and the third encryption key are different encryption keys based on different levels of access, and wherein a field in metadata is used by a backup policy to identify at least one of the first encryption key and the second encryption key; and
      provide an encryption key of the plurality of keys to an offsite archiving location, the encryption key providing access to the metadata, wherein the encryption key is provided to the offsite archiving location securely and separately from storage media.

18. A system providing multiple levels of security for a backup medium comprising:
   one or more processors communicatively coupled to a network, wherein the one or more processors are configured to:
      receive at a media drive a plurality of encryption keys from backup management software, wherein at least one encryption key of the plurality of encryption keys is received at the media drive using a Small Computer System Interface (SCSI) command;
      receive data and metadata associated with the data;
      encrypt a data portion of the backup medium with a first encryption key;
      encrypt a first metadata portion of the backup medium with a second encryption key;
      encrypt a second metadata portion with a third encryption key, wherein the first encryption key, the second encryption key, and the third encryption key are different encryption keys based on different levels of access, and wherein a field in metadata is used by a backup policy to identify at least one of the first encryption key and the second encryption key; and
      provide an encryption key of the plurality of keys to an offsite archiving location, the encryption key providing access to the metadata, wherein the encryption key is provided to the offsite archiving location securely and separately from storage media.

19. The system of claim 18, wherein the backup medium comprises tape.

* * * * *